United States Patent
Dobbin et al.

(10) Patent No.: US 9,764,854 B2
(45) Date of Patent: Sep. 19, 2017

(54) CAP TO ACCOMMODATE WASHERS

(71) Applicant: AIRBUS OPERATIONS LIMITED, Bristol (GB)

(72) Inventors: Richard Dobbin, Bristol (GB); Anthony Dowson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/908,914

(22) PCT Filed: Jul. 2, 2014

(86) PCT No.: PCT/GB2014/052016
§ 371 (c)(1),
(2) Date: Jan. 29, 2016

(87) PCT Pub. No.: WO2015/015153
PCT Pub. Date: Feb. 5, 2015

(65) Prior Publication Data
US 2016/0159493 A1     Jun. 9, 2016

(30) Foreign Application Priority Data

Jul. 31, 2013 (GB) .................................. 1313669.2

(51) Int. Cl.
| A47G 3/00 | (2006.01) |
| B64D 45/02 | (2006.01) |
| F16B 33/00 | (2006.01) |
| F16B 37/14 | (2006.01) |

(52) U.S. Cl.
CPC ............ *B64D 45/02* (2013.01); *F16B 33/004* (2013.01); *F16B 37/14* (2013.01)

(58) Field of Classification Search
CPC ........ F16B 33/004; F16B 37/14; B64D 45/02; A47G 3/00

USPC .......................... 411/372.5, 372.6, 373, 377
See application file for complete search history.

(56) References Cited

U.S. PATENT DOCUMENTS 4,293,243 A * 10/1981 Graybeal ................. A47G 3/00
                                                               405/259.1
4,557,654 A * 12/1985 Masuda ................... F16B 37/14
                                                               411/373

(Continued)

FOREIGN PATENT DOCUMENTS

| EP | 0334011 A1 | 9/1989 |
| FR | 2626629 A1 | 8/1989 |
| WO | 2012107741 A1 | 8/2012 |

OTHER PUBLICATIONS

Search Report dated Jan. 6, 2014 issued in Great Britain Application No. 1313669.2.
ISR and WO dated Sep. 30, 2014 issued in PCT/GB2014/052016.

*Primary Examiner* — Roberta Delisle
(74) *Attorney, Agent, or Firm* — Hauptman Ham LLP

(57) ABSTRACT

A joint is disclosed having a structure, a fastener passing through the structure with an end of the fastener protruding from the structure, and a cap installed on the end of the fastener. The end of the fastener includes an axially extending shaft, a fastener head carried by the shaft, and one or more washers located between the fastener head and the structure, the one or more washers spacing the fastener head and the structure apart by a distance. The cap has a cap body with a cavity which encloses the end of the fastener, and the joint further comprises a cured sealing material which seals the cavity. One of the fastener head and the cap body is formed with two or more first locking features which are axially spaced apart by a pitch.

9 Claims, 7 Drawing Sheets

(56) References Cited

U.S. PATENT DOCUMENTS

| | | | | |
|---|---|---|---|---|
| 4,826,380 A * | 5/1989 | Henry | ............... | B64D 45/02 |
| | | | | 156/229 |
| 4,968,202 A * | 11/1990 | Lanham | ............... | B60B 7/00 |
| | | | | 411/377 |
| 5,048,898 A * | 9/1991 | Russell | ............... | B60B 7/00 |
| | | | | 301/37.374 |
| 5,082,409 A * | 1/1992 | Bias | ............... | F16B 37/14 |
| | | | | 411/372.5 |
| 5,350,266 A * | 9/1994 | Espey | ............... | B62J 23/00 |
| | | | | 403/375 |
| 5,360,304 A * | 11/1994 | Notaro | ............... | F16B 41/005 |
| | | | | 411/377 |
| 5,810,532 A * | 9/1998 | Huang | ............... | F16B 37/14 |
| | | | | 411/377 |
| 5,857,818 A * | 1/1999 | Bias, Sr. | ............... | F16B 37/14 |
| | | | | 411/373 |
| 6,238,158 B1 * | 5/2001 | Clements | ............... | F16B 37/14 |
| | | | | 411/372.6 |
| 6,318,942 B1 * | 11/2001 | Wieczorek | ............... | F16B 37/14 |
| | | | | 411/374 |
| 8,616,868 B2 * | 12/2013 | Hutter, III | ............... | B29C 33/00 |
| | | | | 156/578 |
| 2012/0074257 A1 | 3/2012 | Bessho et al. | | |
| 2012/0219380 A1 | 8/2012 | Hutter, III | | |
| 2013/0322982 A1 | 12/2013 | Dobbin | | |

* cited by examiner

CAP TO ACCOMMODATE WASHERS

RELATED APPLICATIONS

The present application is a National Phase of International Application Number PCT/GB2014/052016, filed Jul. 2, 2014, which claims priority from Great Britain Application Number 1313669.2, filed Jul. 31, 2013.

FIELD OF THE INVENTION

The present invention relates to a joint comprising a cap forming a sealed cavity around an end of a fastener with one or more washers, and a kit of parts and method of installation for forming such a joint.

BACKGROUND OF THE INVENTION

FIG. 1 is a side view of part of a fastener assembly passing through a panel 1, which may be a composite or metallic panel. The assembly comprises a fastener comprising an externally threaded bolt 2, an internally threaded nut 3, and a washer 4 (the fastener may alternatively comprise any other known fastener type, such as a rivet or swage fastener). In the event of a lightning strike hitting the panel 1 and attaching to the fastener, sparking, plasma or out-gassing may occur at the locations indicated by reference 5 in FIG. 1. The panel 1 may provide a fuel tank boundary and the fastener may therefore be immersed in fuel. A lightning strike at the fastener may thus provide sparking and hot gas ignition sources which could cause ignition of the fuel.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

It is often necessary to install a spark and/or plasma out-gassing suppression cap on fastener heads both with and without washers. A single piece of structure, such as an aircraft panel, may include hundreds of fasteners, some with washers and some without, and it is usually impractical to install a different type or size of cap on those fastener heads with washers than on those without. In general terms, the invention proposes a joint in which a spark suppression cap and fastener head have locking features which enable them to be attached to one another, both when a washer is installed under the fastener head and when there is no washer.

A first aspect of the invention provides a joint comprising: a structure; a fastener passing through the structure with an end of the fastener protruding from the structure, the end of the fastener comprising: an axially extending shaft, a fastener head carried by the shaft, and one or more washers located between the fastener head and the structure, the one or more washers spacing the fastener head and the structure apart by a distance; a cap having a cap body with a cavity which encloses the end of the fastener; and a cured sealing material which seals the cavity, wherein: one of the fastener head and the cap body is formed with two or more first locking features which are axially spaced apart by a pitch, and the other of the cap body and the fastener head is formed with one or more second locking features which are each capable of interlocking with one of the first locking features, at least one of the second locking features is interlocked with a respective one of the first locking features to secure the cap to the fastener head; and the distance between the fastener head and the structure is an integer multiple of the pitch between the first locking features.

The joint can thus easily be reconfigured to exclude the one or more washers, without any modification of the cap or other fastener parts. That is, since the pitch of the axially spaced first locking features is an integer factor of the thickness of the one or more washers (i.e. the distance between the fastener head and the structure), by interlocking the at least one second locking feature with a different respective one of the first locking features the axial position of the cap relative to the fastener head can be altered by an amount corresponding to that washer thickness. In this way, the cap of the invention can be installed on fastener ends with and without washers.

This arrangement simplifies manufacture of an assembly comprising multiple fasteners since it is not necessary to select one type of cap for fastener ends with washers and a different type of cap for fastener ends without washers.

The interlocked first and second locking features primarily serve to secure the cap to the fastener head both during and after assembly. For example, in embodiments in which the sealing material is injected into the cap after it is installed on the fastener head the sealing material will tend to force the cap away from the fastener head, with a typical load of 5-30 kg being required to prevent the cap becoming detached. The interlocked first and second locking features thus avoid the installer needing to apply such a force to hold the cap in place during installation. They also may prevent any undesirable lifting of the cap away from the fastener head which could allow sealing material to enter the cavity, thus compromising the lightning strike performance, and keep the cap in place during curing of the sealing material, even when the cap is inverted or when it is accidentally knocked. Undesirable lifting of the cap away from the fastener head may be caused by hydraulicing of the sealing material, particularly where the sealing material is located between inner and outer cap members.

The sealing material may comprise a material with adhesive properties and may adhere the cap to the structure and/or the fastener end. The interlocking first and second locking features may thus provide a secondary means of attachment between the cap and the fastener head in the event that the sealing material bond fails.

The first and second locking features may comprise any mechanical locking features which can interact to prevent relative axial movement between the cap and the fastener end. In a preferred embodiment each of either the first locking features or the second locking features comprises a protrusion and each of the other of the first locking features and the second locking features comprises a recess, and at least one of the protrusions is received within a respective one of the recesses to secure the cap to the fastener head. Such protrusions and recesses are straightforward to manufacture.

There is preferably an interference fit between said at least one of the protrusions and the recess within which it is received. This arrangement provides a particularly robust interconnection between the cap and the fastener end.

In some embodiments the fastener head or cap body is formed with two or more second locking features, the other of the fastener head or cap body is formed with three or more first locking features, and at least two of the second locking features are interlocked with a respective two of the first locking features. Such dual interlocking provides a particularly strong interconnection between the cap and fastener end.

The cap may comprise a plurality of vanes protruding from the cap body into the cavity, the vanes each being formed with either the two or more first locking features or the one or more second locking features. The vanes thus serve to locate the cap on the fastener end and provide the means of interconnection between them.

A second aspect of the present invention provides a method of installing a cap on an end of a fastener protruding from a structure through which the fastener passes, wherein: the end of the fastener comprises an axially extending shaft, a fastener head carried by the shaft, and one or more washers located between the fastener head and the structure, the one or more washers spacing the fastener head and the structure apart by a distance; the cap has a cap body with a cavity; one of the fastener head and the cap body is formed with two or more first locking features which are axially spaced apart by a pitch, and the other of the cap body and the fastener head is formed with one or more second locking features which are each capable of interlocking with one of the first locking features; and the distance between the fastener head and the structure is an integer multiple of the pitch between the first locking features, the method including the steps of: installing the cap on the end of the fastener such that the cavity encloses the end of the fastener and at least one of the second locking features is interlocked with a respective one of the first locking features; and applying a sealing material to seal the cavity, and curing the sealing material.

A third aspect of the invention provides a kit of parts for forming a joint, including: a fastener for passing through a structure, an end of the fastener comprising an axially extending shaft, a fastener head carried by the shaft, and one or more washers for locating between the fastener head and the structure, the one or more washers having a thickness configured to space the fastener head and the structure apart by a distance; a cap having a cap body with a cavity configured to enclose the end of the fastener; and a curable sealing material for sealing the cavity, wherein: one of the fastener head and the cap body is formed with two or more first locking features which are axially spaced apart by a pitch, the other of the cap body and the fastener head is formed with one or more second locking features which are each capable of interlocking with one of the first locking features; each of the one or more second locking features is configured to interlock with a respective one of the two or more first locking features to secure the cap to the fastener head; and the distance between the fastener head and the structure is an integer multiple of the pitch between the first locking features.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
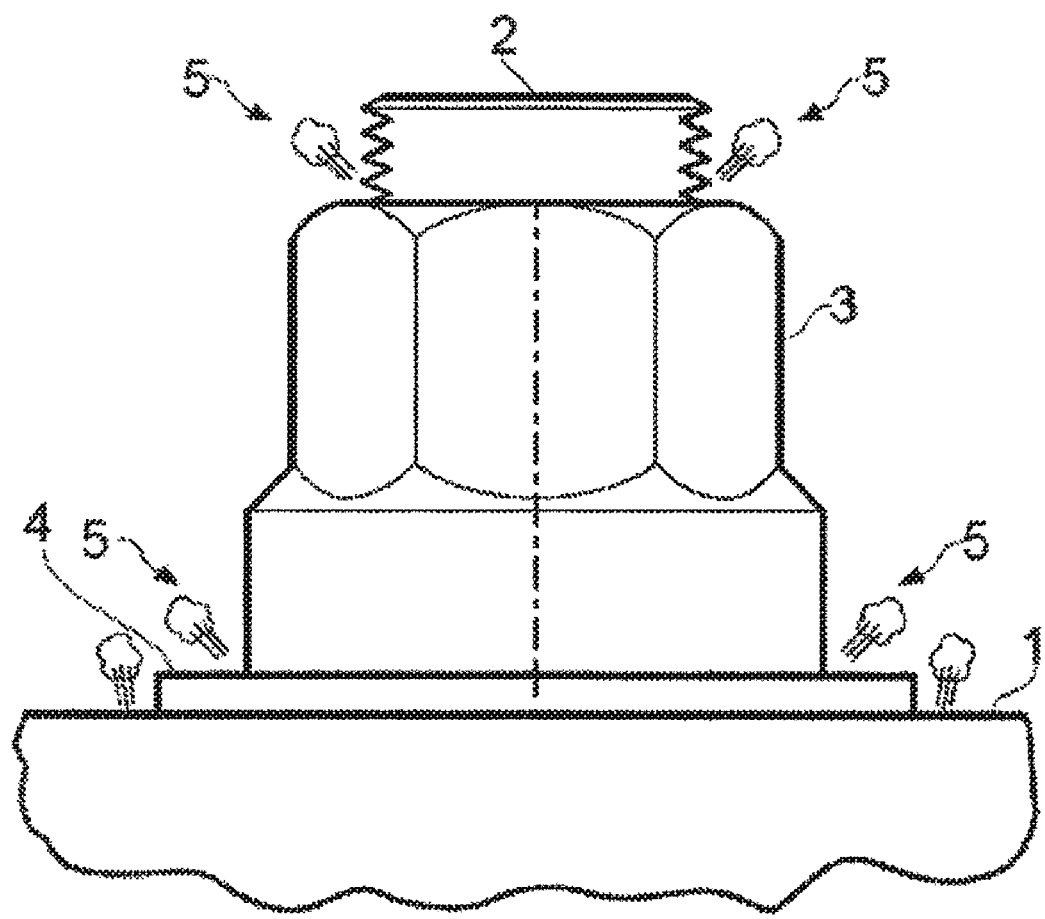
FIG. 1 is a side view of a prior art fastener assembly.
Figure 2:
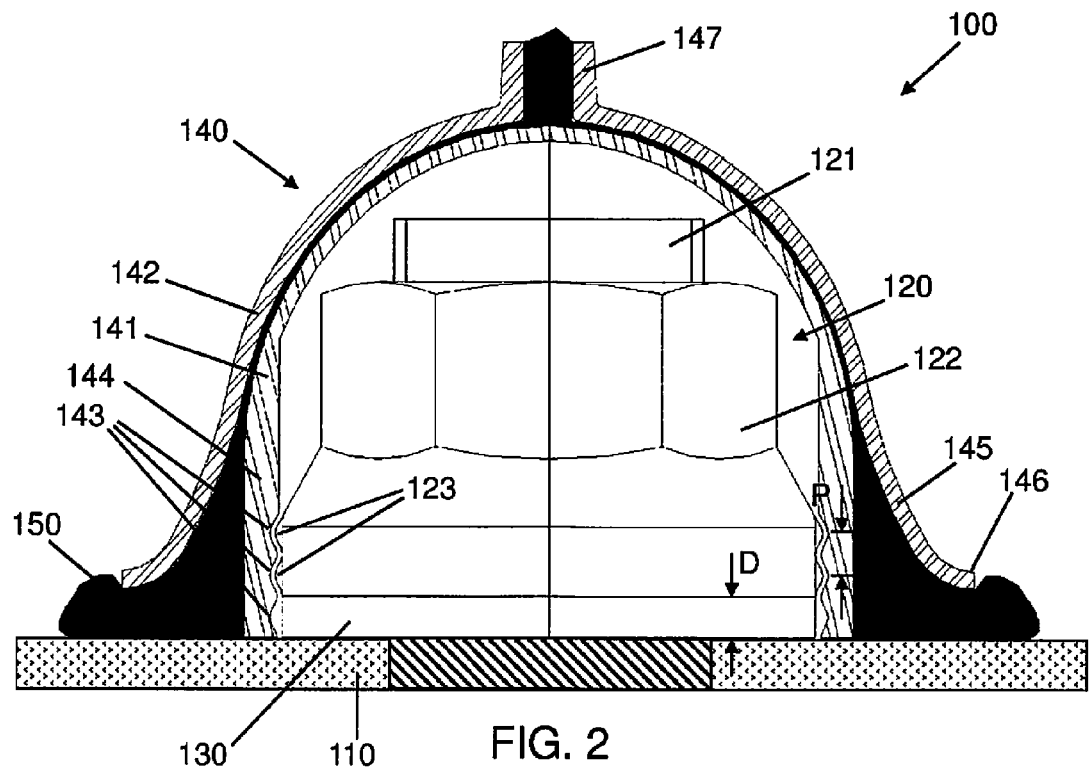
FIG. 2 is a partial cross-sectional view of a joint according to a first embodiment of the invention, taken at the plane indicated by the line A-A in FIG. 4.
Figure 3:
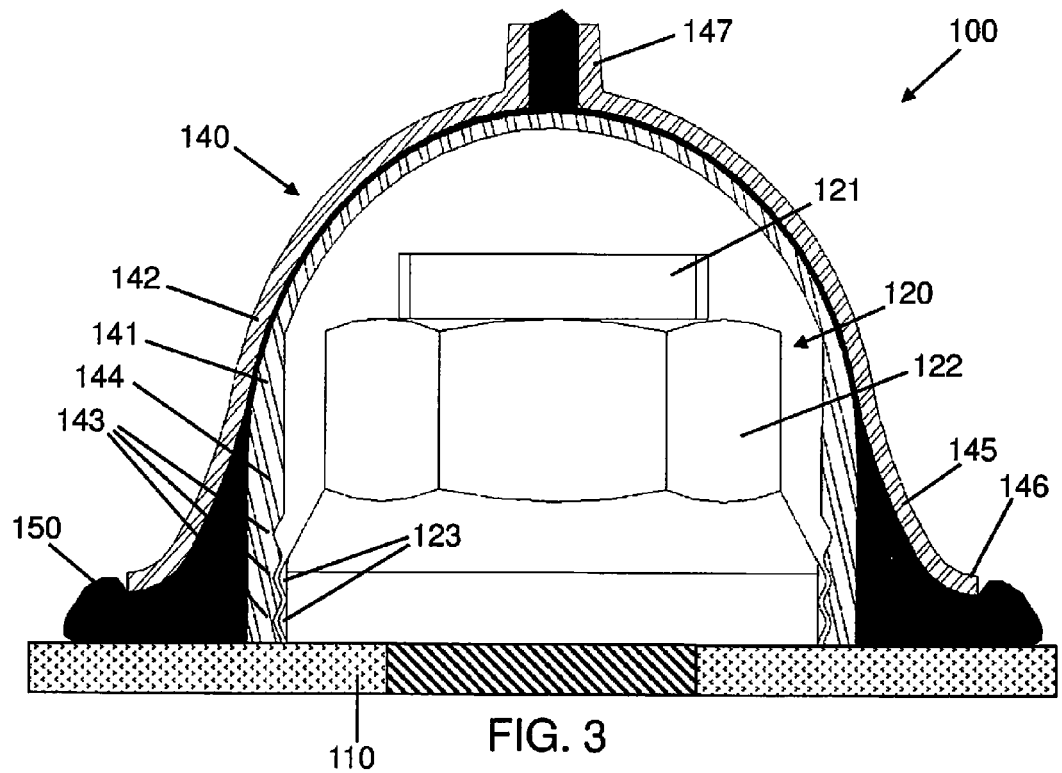
FIG. 3 shows the partial cross-sectional view of the joint of FIG. 2, but with the washer removed.
Figure 4:
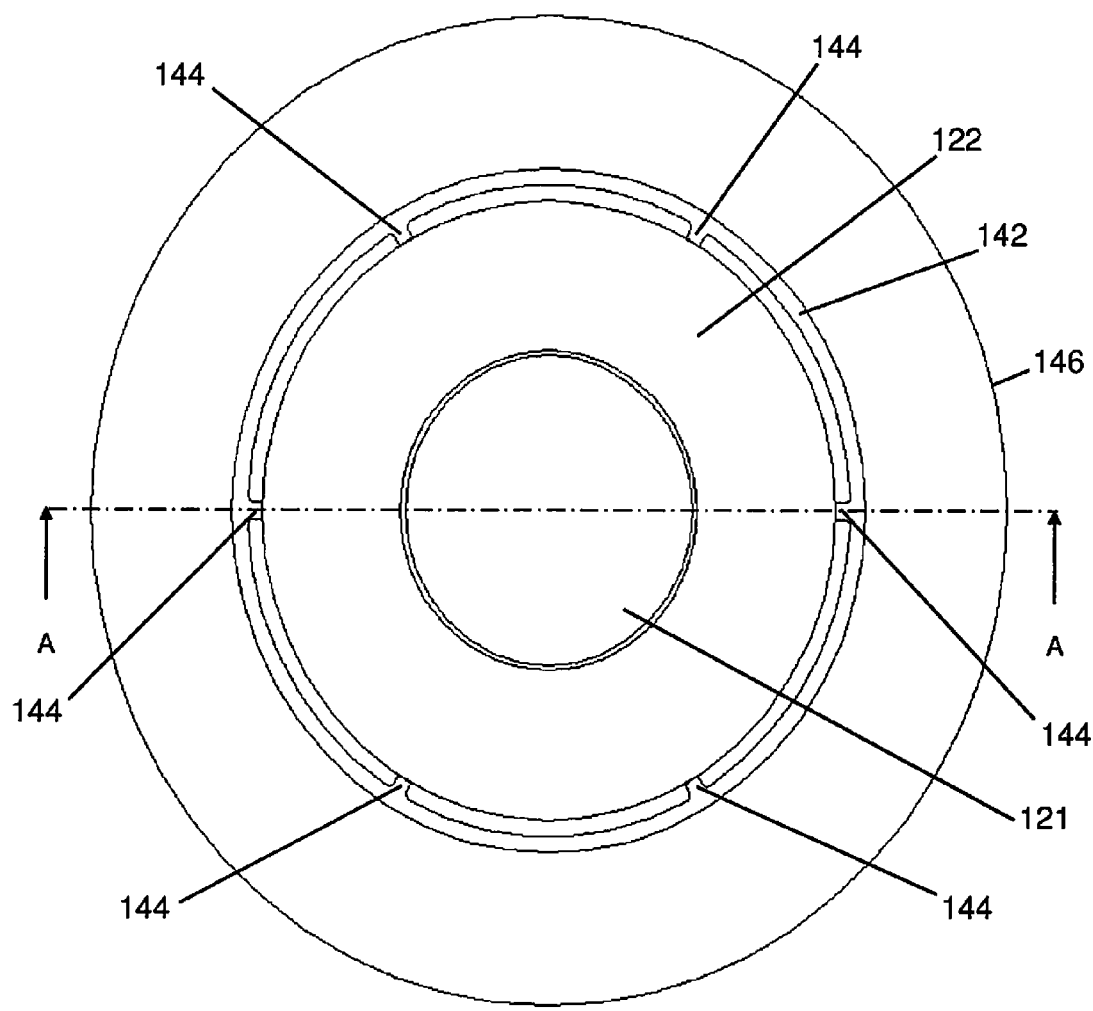
FIG. 4 is a transverse cross-sectional view of the joint of FIG. 2.

A joint 100 shown in FIG. 2 comprises a structure 110 such as an aircraft skin panel, which in this embodiment is a composite aircraft structural component, but may be a metallic component or a hybrid composite-metallic component. An end 120 of a fastener protrudes from the structure. The fastener comprises an axially extending shaft 121 which passes through the structure 110, and a fastener head 122. In this case the fastener head 122 is a nut screwed onto the shaft 121, although it may alternatively be a bolt head carried by the shaft. A washer 130 is located between the fastener head 122 and the structure 110 and spaces the fastener head and the structure apart by a distance D. FIG. 3 shows the joint 100 without the washer 130 fitted.

A cap 140 encloses the end of the fastener. The cap comprises an inner cap member 141 and an outer cap member 142. A cured sealing material 150 fills the void between the inner and outer cap members and adheres the cap 140 to the structure 110. The sealing material 150 also serves to bond the inner cap member 141 and outer cap member 142 together, and adds structural rigidity to the cap 140. The inner and outer cap members 141, 142 are injection moulded from a thermoplastic material such as glass-filled polyetherimide (PEI). A suitable glass-filled PEI is Ultem™ 2400, which includes 40% glass fibres by volume. The inner and outer cap members may alternatively be made by moulding, by an additive manufacturing process, or by any other suitable process.

The inner cap member 141 is a generally thin-walled dome-shaped member, with a correspondingly dome-shaped inner air cavity which encloses the fastener end 120. The inner cap member 141 is generally made up of a base cylindrical portion and an upper dome portion. Six identical vanes 144 protrude into the cavity from the base cylindrical portion, the vanes 144 being generally elongate and extending substantially in the axial direction of the fastener end 120. The vanes 144 abut the fastener head 122 to ensure the inner cap member 141 is correctly located coaxial with the fastener end 120.

Each vane 144 is formed with three recesses 143 which are axially spaced apart by a pitch P. The fastener head is formed with two protrusions 123, each being received within a respective one of the recesses 143 to secure the cap to the fastener head and prevent relative axial movement therebetween. This arrangement interconnects the cap 140 and fastener end 120 to prevent the cap 140 from becoming detached from the fastener head during application of the sealing material 150, as discussed below.

The recesses 143 and protrusions 123 have a depth of from 0.1 mm to 0.5 mm, typically 0.3 mm. Such a size has been found to be sufficiently large to secure the cap to the fastener head, while also being small enough to permit ejection of the cap from a plastics injection mould. The recesses 143 and protrusions 123 are sized such that there is an interference fit between them. That is, the largest diameter of the protrusions 123 (major diameter) is marginally larger than the smallest diameter of the recesses 143 (minor diameter), as illustrated in FIGS. 2 and 3. An appropriate interference fit is approximately 0.025 or 0.050 mm.

The pitch P between the recesses is chosen such that the desired distance D between the fastener head 122 and the structure 110 to accommodate the installation of one or more washers therein is an integer multiple of that pitch P. For example, if the design is to accommodate the installation of a washer which is 1.6 mm thick, a washer which is 0.8 mm thick, or a combination of both such washers (i.e. a washer thickness of 2.4 mm), the pitch P must be 0.8 mm, since 0.8 mm is an integer factor of all of those washer thicknesses.

In the illustrated embodiment of FIGS. 2 and 3 the distance D corresponds to the thickness of the washer 130 and D is equal to P. The effect of this is that the inner cap 141 can be secured to the fastener head 122 in one of two axial positions: one in which the washer 130 can be located between the structure 110 and the fastener head (FIG. 2); and one in which there is no washer (FIG. 3). In the configuration shown in FIG. 2 the two protrusions 123 of the fastener head 122 are received within the two recesses 143 of the inner cap 141 which are furthest from the structure 110, so that there is a gap (D) between the fastener head and the structure within which the washer 130 is located. In the configuration shown in FIG. 3 the two protrusions 123 are instead received within the two recesses 143 which are closest to the structure 110 so that there is no gap between the fastener head and the structure.

In other embodiments there may be no vanes 144, and the recesses 143 may be formed as continuous or discontinuous annular grooves around the circumference of the cylindrical portion of the inner cap member 141. In a further variation, the recesses 143 may be formed in the fastener head 122 and the protrusions 123 may be formed in the inner cap 141. In another variation, the recesses may be replaced by protrusions, for example in the form of ratchet teeth or similar; the protrusions of the cap being forced past the protrusions of the fastener head during installation of the cap onto the fastener head, and the two sets of protrusions thereafter abutting one another to prevent unwanted removal of the cap.

The outer cap member 142 is also a generally thin-walled dome shaped member, and is shaped to fit over the inner cap member 141 so that there is a continuous sealing volume between them which is filled with the cured sealing material 150. The outer cap member 142 is generally made up of an upper dome portion which generally corresponds in shape to the dome portion of the inner cap member 141, and an annular flared skirt portion 145 which terminates at a lip 146.

The outer cap member 142 has a central opening with a cylindrical nozzle connector 147 which extends from the its upper dome portion, the nozzle connector 147 being sized to interconnect with the nozzle (not shown) of a sealing material injector gun (not shown). The injector gun delivers a continuous flow of sealing material 150 into the sealing volume via the opening of the nozzle connector 147. In the present embodiment a two-part polysulphide based sealant such as MC-238 Class A/B, produced by Naftoseal™ is preferred. A suitable alternative material is a. two-part epoxy based structural adhesive such as Scotch-Weld™ 7256 B/A, produced by 3M™.

The flared skirt portion 145 of the outer cap member 142 and the lower portion of the inner cap member 141 together define an annular sealing volume within which a fillet of sealing material 150 is formed. The annular sealing volume has a generally flared shape such that its cross-sectional area increases with distance from the nozzle opening 147 of the outer cap member. The annular sealing volume is open at its lower face such that the sealing material 150 can flow outwardly from the sealing volume between the inner and outer cap members and into contact with the structural element 110. The flared shape of the annular sealing volume provides a large adhesion area for the sealing material 150, which, once cured, acts to seal the cap 140 to the structural element 110. Moreover, this large adhesion area is achieved within a relatively small footprint on the structural element.

The lip 146 of the outer cap member 142 is axially offset from the base edge of the inner cap member 141 in the embodiment of FIGS. 2 and 3. This arrangement permits a small amount of sealing material to protrude from the base of the outer cap member 142 so that the user can visually detect whether the seal is complete. It also ensures that the outer cap member 142 does not clash with features of the structural element, such as ramps or radii (fillets), in the event that the fastener is located very close to such features. Such a potential clash is not uncommon in aircraft structures, where it is possible for the outer edge of a fastener to be located only 1.6 mm from the edge of a fillet with a 5 mm radius. It also ensures that the seal is able to accommodate small surface feature deviations in the structural element, and is sufficiently thick to have a degree of flexibility once cured.

In some embodiments the sealing volume between the inner and outer cap members 141, 142 may include features to facilitate the even distribution of sealing material 150 and/or to reduce resistance to flow of sealing material. For example, the sealing volume may include a reservoir (not shown) directly beneath the nozzle opening 147 to receive sealing material directly therefrom. Such a reservoir may reduce flow resistance and promote a uniform flow around the circumference of the sealing volume. Other such features may include a flow restriction region 39 (not shown) comprising a region of decreased cross-sectional area in the sealing volume to increase resistance to flow of sealing material 150 in that region. This provides an even distribution of sealing material 150 around the annular sealing volume because sealing material 150 becomes 'backed up' above the flow restriction region until the whole sealing volume is filled with sealing material.

Figure 5:
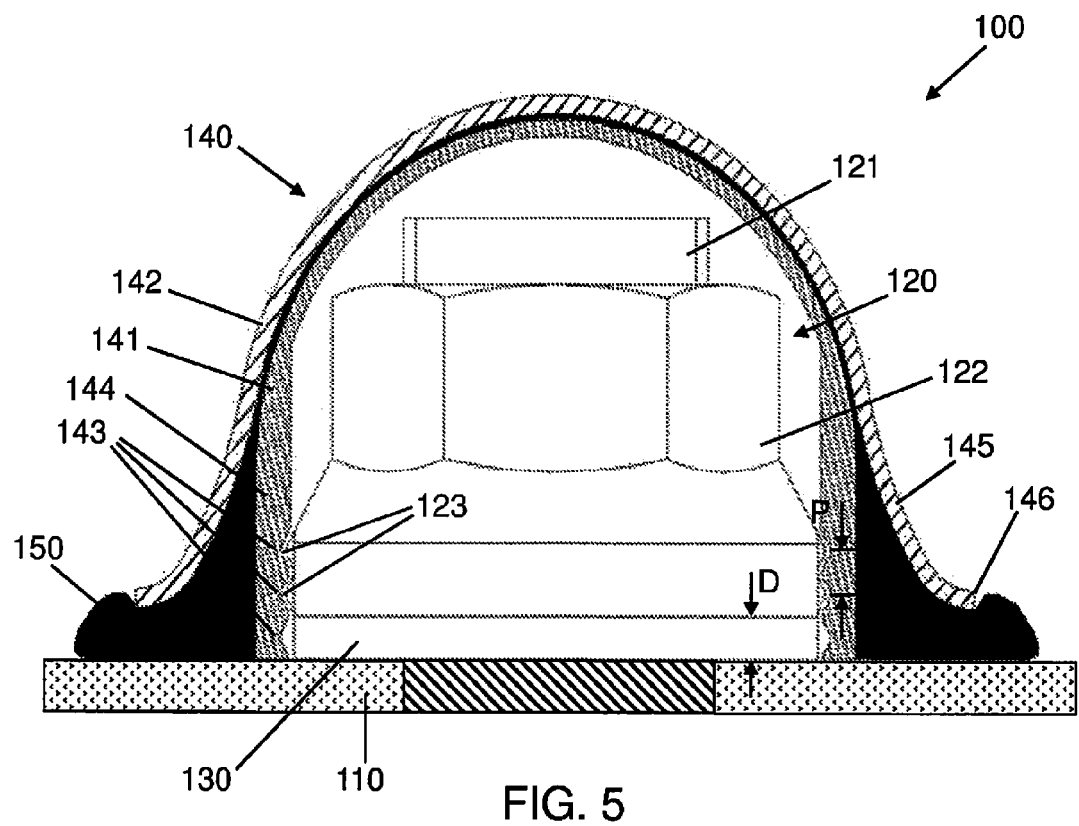
FIG. 5 is a partial cross-sectional view of a joint according to a second embodiment of the invention.
Figure 6:
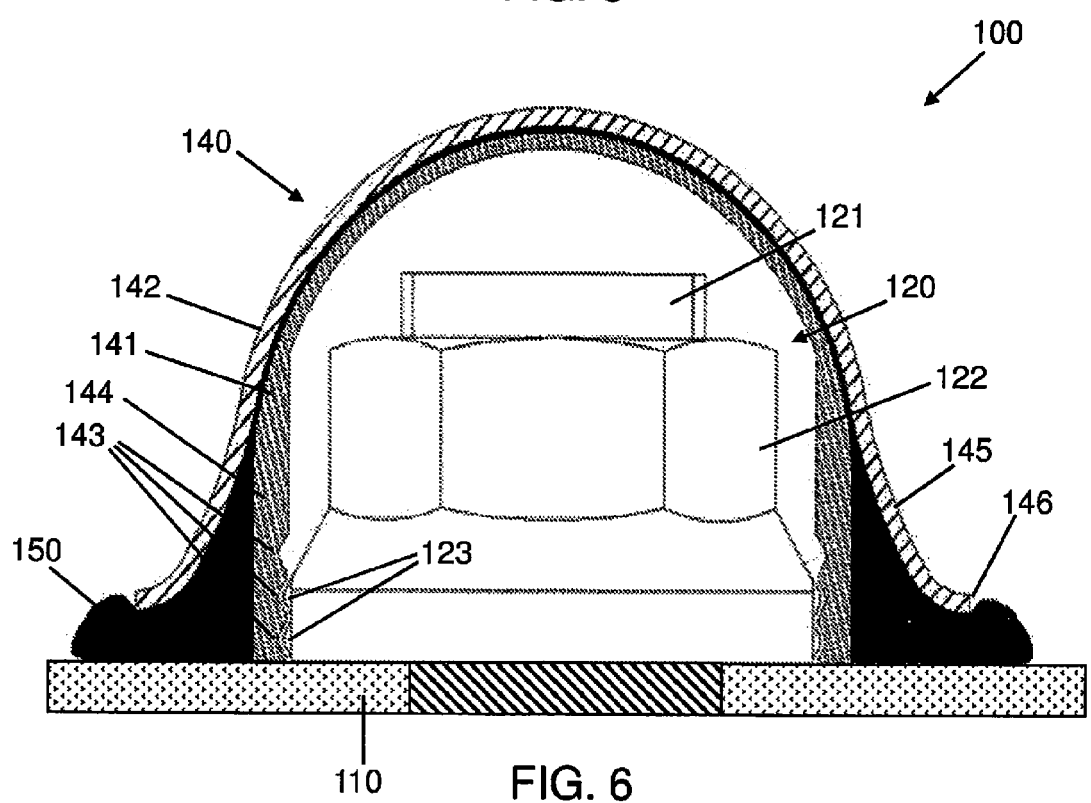
FIG. 6 shows the partial cross-sectional view of the joint of FIG. 5, but with the washer removed.

The embodiment shown in FIGS. 5 and 6 is very similar to the embodiment of FIGS. 2 and 3, and like parts are identified with the same reference numerals to aid clarity. The only structural difference in this embodiment is the absence of the nozzle connector 147 and associated opening. Instead, the uncured sealing material 150 is first introduced into the concave dome portion of the outer cap member 142, the inner cap member 141 is installed onto the fastener end 120, and the outer cap member 142 is subsequently installed onto the inner cap member so that the uncured sealing material 150 flows between the inner and outer cap members and forms a fillet in the annular sealing volume, as shown in the figures. The sealing material 150 is then cured to adhere the inner cap to the outer cap, and to adhere the cap 140 to the structure 110.

In alternative embodiments it may be possible to have a one part cap. For example, such a cap may have the features of the inner cap member 141 of FIGS. 2-6 and an additional flared skirt extending radially outwardly from an upper region of its cylindrical base portion. A fillet of sealing material may then be formed within the annular sealing region formed beneath that flared skirt.

Figure 7:
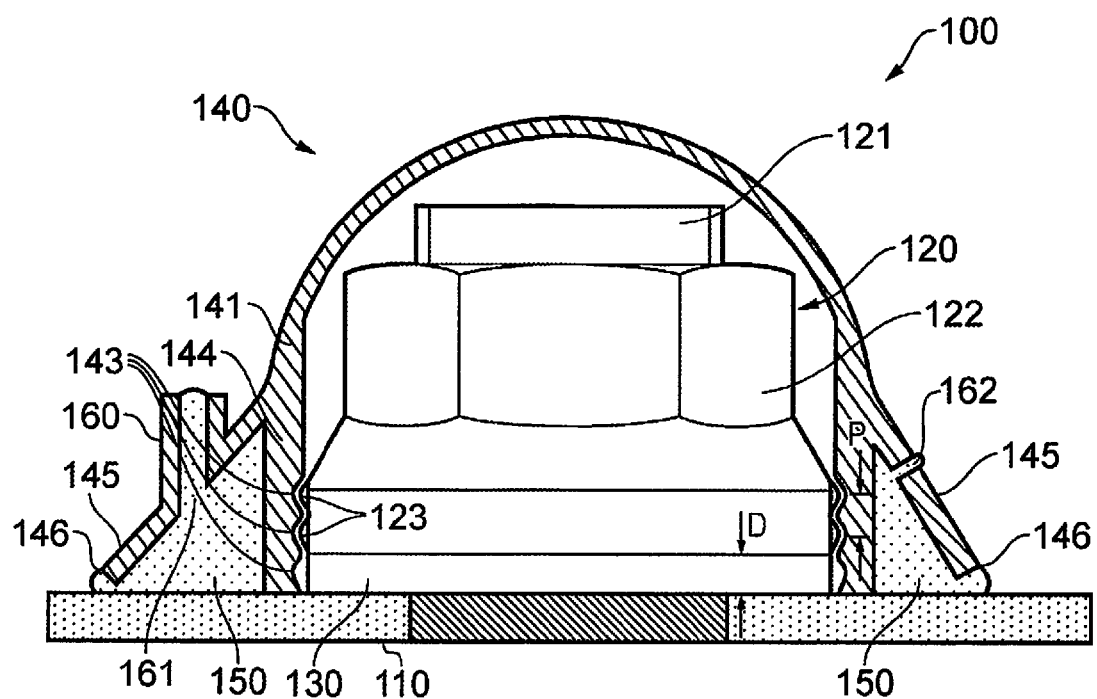
FIG. 7 shows a partial cross-sectional view of a joint according to a third embodiment of the invention.
Figure 8:
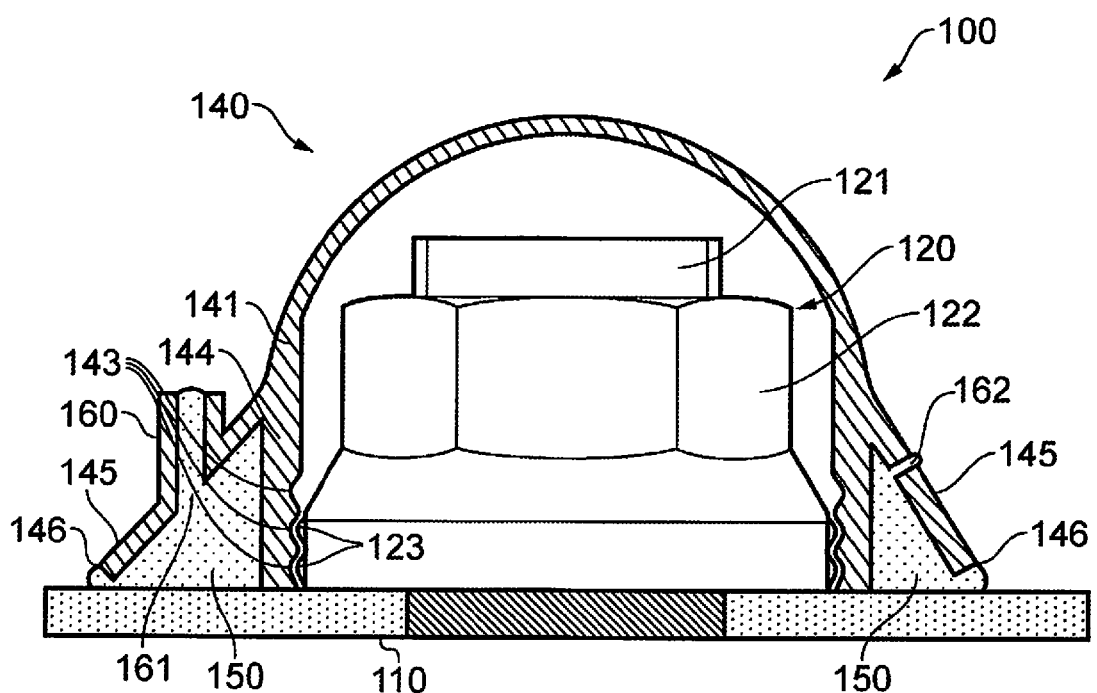
FIG. 8 shows the partial cross-sectional view of the joint of FIG. 7, but with the washer removed

An exemplary one part cap is illustrated in FIGS. 7 and 8, FIG. 7 showing the cap 140 installed with a washer 130 under the fastener head 122 and FIG. 8 showing the cap installed without a washer. The cap 140 is identical to that of the first and second embodiments of FIGS. 2-6, with the exception that the outer cap member 142 is omitted and the inner cap member 141 comprises the annular flared skirt portion 145. In particular, the axially spaced recesses 143 and protrusions 123 of the inner cap member 141 and fastener head, respectively, are identical to those of the first and second embodiments and may be modified as appropriate.

The flared skirt portion 145 of the inner cap member 141 and the base cylindrical portion of the inner cap member 141 together define an annular sealing volume within which a fillet of sealing material 150 is formed. The annular sealing volume has a generally flared shape such that its cross-sectional area increases with distance from the upper dome portion of the inner cap member. The flared skirt portion 145 includes a tubular projection 160 (tubular collar, or boss) which projects outwardly from the skirt and provides an injection channel leading to a circular inlet hole 161. The tubular projection 160 is arranged to interconnect with a nozzle (not shown) of a sealing material injection device to provide a flow of sealing material 150 through the skirt via the inlet hole 161 into the annular sealing volume. In this case they are interconnected by the projection 160 being received within the nozzle, although the opposite arrangement is also possible.

The flared skirt portion 145 also has a circular outlet hole 162 on an opposite side of the central cap axis to the inlet hole 161. The outlet hole 162 is in fluid communication with the annular sealing volume and is arranged to enable air to escape the volume through the skirt via the outlet hole 162 as the sealing material 150 flows from the inlet hole 161 into the volume. When the annular sealing volume is full, then the pressure within increases until it forces sealing material to escape the volume through the skirt via the outlet hole 162. When this flow of sealing material out of the outlet hole 162 is visually observed, the flow of sealing material from the sealing material injection device is stopped and the sealing material injection device is removed.

The sealing material is then allowed to cure, leaving a cured sealing material 150 in the annular sealing volume which secures the cap to the structure and forms a seal around the cavity. This seal prevents the ingress of water or other contaminants into the cavity, and also prevents plasma or other out-gassing products from exiting the cavity in the event of a lightning strike. The cured sealing material 150 has a small stub (or overflow portion) protruding from the outlet hole 162. Cured sealing material 150 also fills the injection channel and the inlet hole 161.

The outlet hole 162 is formed in the body of the skirt as a closed hole with a portion of skirt between the outlet hole 162 and the skirt rim 146. The outlet hole 162 has an axial position which is closer to an axial position of the closed outboard end of the annular sealing volume than it is to an axial position of the open inboard end of the volume. In other words, a centre of the outlet hole 162 is positioned closer to the location at which the flared skirt portion 145 is connected to the base cylindrical portion of the inner cap member 141 than to the skirt rim 146. Positioning the outlet hole 162 towards the outboard (top) end of the annular sealing volume in this way is preferred since it ensures that the pocket is completely full (without air gaps) before the sealing material starts to flow out. Also, providing only a single outlet hole 162 in the skirt (rather than multiple outlet holes) ensures that the sealing material only starts flowing out when the pocket is completely full. In other embodiments the outlet hole 162 may be formed as a notch or mousehole opening in the skirt 145, so that it provides a break in the skirt rim 146.

Figure 9:
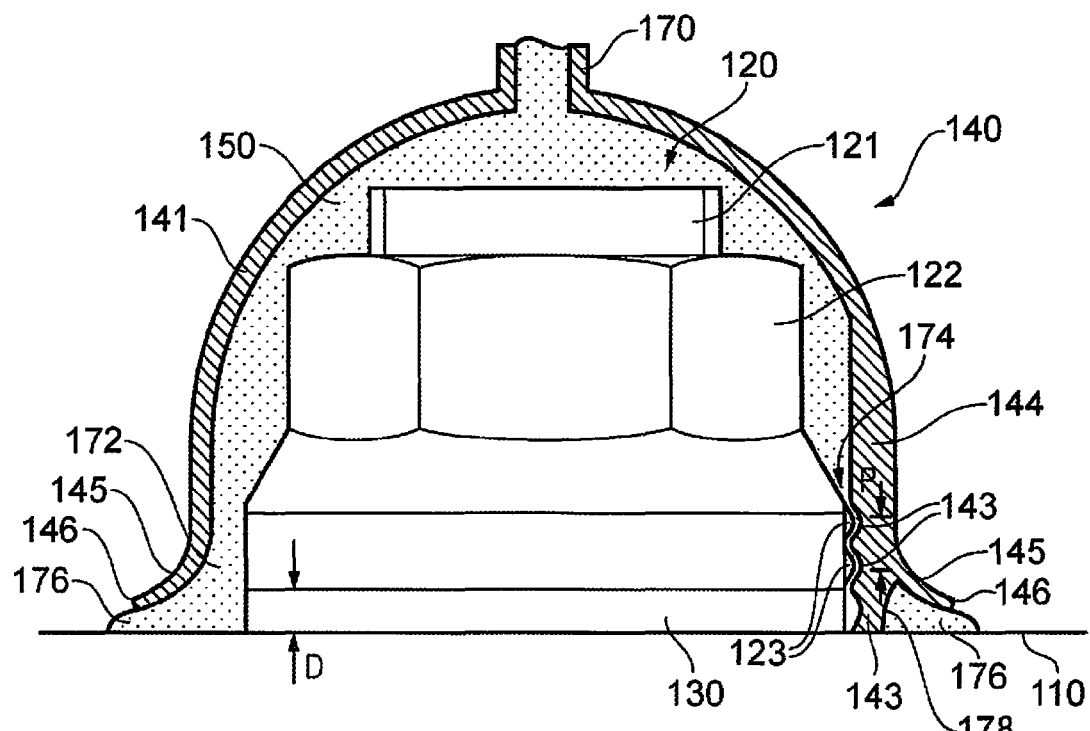
FIG. 9 shows a partial cross-sectional view of a joint according to a fourth embodiment of the invention.
Figure 10:
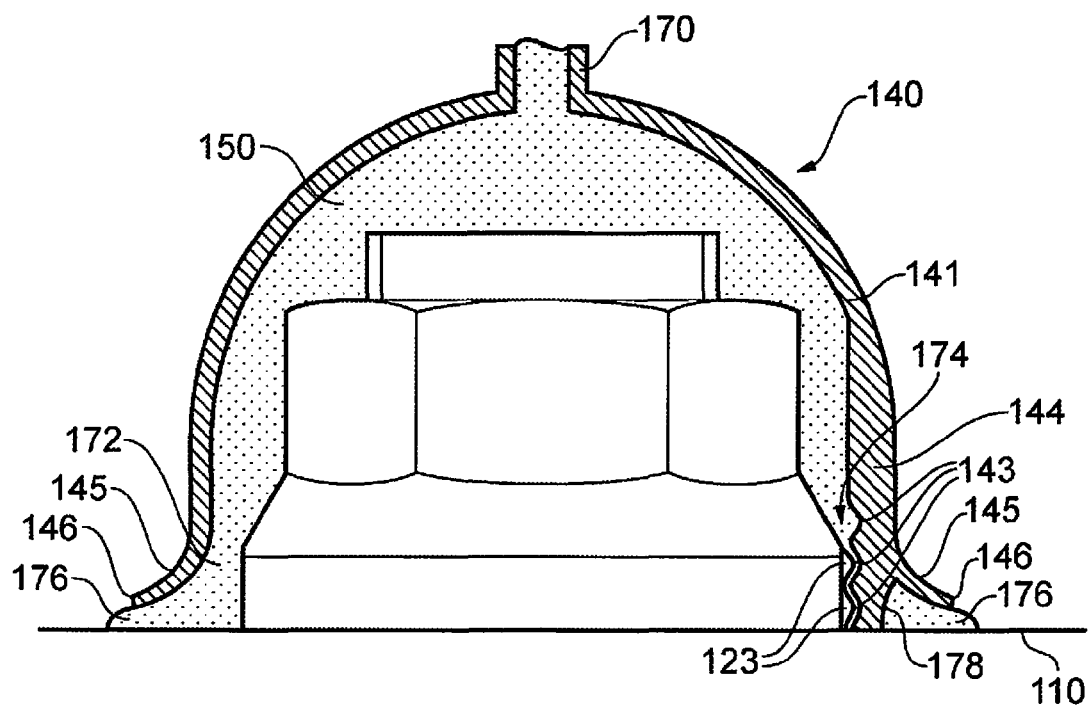
FIG. 10 shows the partial cross-sectional view of the joint of FIG. 9, but with the washer removed.
Figure 11:
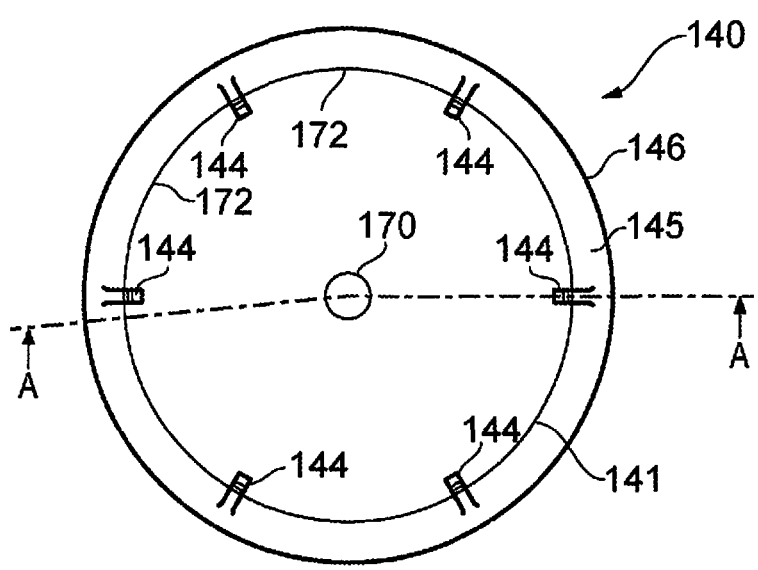
FIG. 11 is a plan view of the underside of the cap of the fourth embodiment, showing the line A-A along which the cross-sectional views of FIGS. 9 and 10 are taken.

The annular sealing volume is open at its lower face such that the sealing material 150 can flow outwardly from the sealing volume into contact with the structural element 110. The flared shape of the annular sealing volume provides a large adhesion area for the sealing material, which, once cured, acts to seal the cap 140 to the structural element 110. Moreover, this large adhesion area is achieved within a relatively small footprint on the structural element. A second exemplary one part cap is illustrated in FIGS. 9-11, FIG. 9 showing the cap 140 installed with a washer 130 under the fastener head 122, FIG. 10 showing the cap installed without a washer, and FIG. 11 showing a plan view on the underside of the cap. Like the cap of FIGS. 7 and 8, the cap 140 of FIGS. 9-11 is identical to that of the first and second embodiments of FIGS. 2-6, with the exception that the outer cap member 142 is omitted and the inner cap member 141 comprises the annular flared skirt portion 145. In particular, the axially spaced recesses 143 and protrusions 123 of the inner cap member 141 and fastener head, respectively, are identical to those of the first and second embodiments and may be modified as appropriate.

A key difference between the one part cap 140 of the present embodiment and that shown in FIGS. 7 and 8 is that sealing material 150 is injected via an axially central opening in the cap body (inner cap member) 141 rather than via an opening in the annular flared skirt 145. That is, the inner cap member 141 has an axially central opening from which extends a tubular collar or boss 170 which is capable of interconnection with the nozzle (not shown) of a sealing material injection device. Thus, when sealing material is injected via the boss 170, both the entire cavity of the inner cap member 141 and the annular sealing volume defined by the annular flared skirt 145 are filled with sealing material 150.

The annular flared skirt 145 of the cap 140 projects radially outwardly at an acute angle to the central longitudinal cap axis and terminates at an annular rim 146. Six evenly distributed vanes 144 project inwardly into the cavity from the base cylindrical portion, the vanes 144 being generally elongate and extending substantially in the axial direction of the fastener end 120. Although six vanes are shown in this example, the number of vanes may vary from three to seven. The vanes 144 abut the fastener head 122 to ensure the inner cap member 141 is correctly located coaxial with the fastener end 120 and, as described above, the vanes 144 are each formed with three recesses 143 which are axially spaced apart by a pitch P. The fastener head is formed with two protrusions 123, each being received within a respective one of the recesses 143 to secure the cap to the fastener head and prevent relative axial movement therebetween. This arrangement interconnects the cap 140 and fastener end 120 to prevent the cap 140 from becoming detached from the fastener head during application of the sealing material 150, as discussed below. The pitch P between the recesses is chosen such that the desired distance D between the fastener head 122 and the structure 110 to accommodate the installation of one or more washers therein is an integer multiple of that pitch P. In the illustrated embodiment of FIGS. 9-11 the distance D corresponds to the thickness of the washer 130 and D is equal to P.

In FIGS. 9 and 10 the nut cap 100 is shown installed over the protruding tail end of a fastener 120 which passes through a structure 101. The fastener comprises a bolt 121, a nut 122 and, optionally, a washer 130 (shown in FIG. 9 but not FIG. 10). Each of the vanes 144 engages a cylindrical outer wall of the nut 122 (and, optionally, a cylindrical outer wall of the washer 130), thus dividing the base half of the cavity of the inner cap member 141 into six separate channels 172 between the vanes 144. That is, each neighbouring pair of vanes 144 defines between them a channel 172. The section of FIGS. 9 and 10 is taken along the line A-A shown in FIG. 11 which passes through one of the vanes 144 (on the right-hand side) and through one of the channels 172 (on the left-hand side).

When connected to the boss 170, the nozzle (not shown) of the sealing material injection device delivers a continuous flow of sealing material 150 into the cavity via the opening. The sealing material 150 flows into the cap 140 so that it completely fills the cavity, contacting the end of the fastener 120 as it does so, without any air gaps remaining. It then flows into contact with the structure 110—again without any air gaps remaining. The cavity has a constriction 174 where the nut 122 meets the vanes 144. This constriction 174 tends to hold back the sealing material until it has completely filled the outboard (upper) part of the cavity above the constriction 174. Once the sealing material has completely filled the outboard part of the cavity, the pressure builds up and forces the sealing material 150 to flow past the constriction 174 and along the channels 172 to the annular rim 146 which forms the inboard end of the cavity.

The annular rim 146 lies in a plane substantially parallel with the structure 110 (i.e. transverse to the cap axis), and each vane 144 extends within the cavity towards the plane of the annular rim 146 then continues to extend through the plane of the annular rim 146 to a protruding inboard end which engages the structure 110 as shown in FIGS. 9 and 10. Since the vanes 144 protrude axially beyond the plane of the annular rim 146, there is an annular gap 176 between the annular rim 146 and the structure 110. This annular gap 176 provides an outlet for sealing material 150 which has flowed along the channels 172, thus enabling the sealing material to extrude out of the gap 176 and form a continuous annular bead or fillet around the periphery of the cap 100. The vanes 144 also each have a concave cut-away profile 178 at their inboard (bottom) end, the cut-away profile 178 providing a void between the inboard end of the ridge and the annular rim 18 to ensure that the annular gap 176 is not interrupted in the region of the vanes 144 and the bead of sealing material has a consistent profile.

During installation, the cap 100 is first placed in the position shown in FIGS. 9 and 10, with the tail end (or alternatively the head end) of a fastener 120 enclosed within the cavity and gripped by the vanes 144. The nozzle (not shown) of the sealing material injector gun is then inserted over the boss 170 to create a temporary seal therebetween. The pre-mixed sealing material 150 is then injected from the nozzle into the cavity, where it collects. The flow of sealing material is constricted in the channels between the vanes 144 so that six uniform flows are formed in each inter-ridge channel 172. The sealing material 150 completely fills the cavity until it flows out through the annular gap 176 formed at the annular rim 146 and makes contact with the structure to form a fillet or bead, at which point the flow of sealing material 150 from the nozzle is stopped. The bead fills the annular gap 176 and protrudes radially beyond the annular rim 146.

After injection of the curable sealing material 150 into the cavity the nozzle is removed and the injected sealing material 150 is left to cure. On curing, it provides a strong adhesive bond between the cap 140 and the structure 110, and also between the cap 140 and the fastener 120.

The cured injected sealing material 150 also serves to fully fill and seal the cavity. Thus, sparking and out-gassing events caused during a lightning strike can be contained. Ingress of fuel, water or other contaminants into the cavity is also prevented.

Although the invention has been described above with reference to one or more preferred embodiments, it will be appreciated that various changes or modifications may be made without departing from the scope of the invention as defined in the appended claims.

The invention claimed is:

1. A joint comprising:
  a structure;
  a fastener passing through the structure with an end of the fastener protruding from the structure, the end of the fastener comprising:
    an axially extending shaft,
    a fastener head carried by the shaft, and
    one or more washers located between the fastener head and the structure, the one or more washers spacing the fastener head and the structure apart by a distance;
  a cap having a cap body with a cavity which encloses the end of the fastener; and
  a cured sealing material which seals the cavity,
  wherein:
  one of the fastener head and the cap body is formed with two or more first locking features which are axially spaced apart by a pitch, and the other of the cap body and the fastener head is formed with one or more second locking features which are each capable of interlocking with one of the first locking features;
  at least one of the second locking features is interlocked with a respective one of the first locking features to secure the cap to the fastener head; and
  the distance between the fastener head and the structure is an integer multiple of the pitch between the first locking features.

2. A joint according to claim 1, wherein each of either the first locking features or the second locking features comprises a protrusion and each of the other of the first locking features and the second locking features comprises a recess, and at least one of the protrusions is received within a respective one of the recesses to secure the cap to the fastener head.

3. A joint according to claim 2, wherein there is an interference fit between said at least one of the protrusions and the recess within which it is received.

4. A joint according to claim 1, wherein the fastener head or cap body is formed with two or more second locking features, the other of the fastener head or cap body is formed with three or more first locking features, and at least two of the second locking features are interlocked with a respective two of the first locking features.

5. A joint according to claim 1, wherein the cap comprises a plurality of vanes protruding from the cap body into the cavity, the vanes each being formed with either the two or more first locking features or the one or more second locking features.

6. A joint according to claim 1, wherein the first locking features are non-helical.

7. A joint according to claim 1, wherein the first locking features are annular.

8. A method of installing a cap on an end of a fastener protruding from a structure through which the fastener passes, wherein: the end of the fastener comprises an axially extending shaft, a fastener head carried by the shaft, and one or more washers located between the fastener head and the structure, the one or more washers spacing the fastener head and the structure apart by a distance; the cap has a cap body with a cavity; one of the fastener head and the cap body is formed with two or more first locking features which are axially spaced apart by a pitch, and the other of the cap body and the fastener head is formed with one or more second locking features which are each capable of interlocking with one of the first locking features; and the distance between the fastener head and the structure is an integer multiple of the pitch between the first locking features, the method including the steps of:
installing the cap on the end of the fastener such that the cavity encloses the end of the fastener and at least one of the second locking features is interlocked with a respective one of the first locking features; and
applying a sealing material to seal the cavity, and curing the sealing material.

9. A kit of parts for forming a joint, including:
a fastener for passing through a structure, an end of the fastener comprising an axially extending shaft, a fastener head carried by the shaft, and one or more washers for locating between the fastener head and the structure, the one or more washers having a thickness configured to space the fastener head and the structure apart by a distance;
a cap having a cap body with a cavity configured to enclose the end of the fastener; and
a curable sealing material for sealing the cavity,
wherein:
one of the fastener head and the cap body is formed with two or more first locking features which are axially spaced apart by a pitch, the other of the cap body and the fastener head is formed with one or more second locking features which are each capable of interlocking with one of the first locking features;
each of the one or more second locking features is configured to interlock with a respective one of the two or more first locking features to secure the cap to the fastener head; and
the distance between the fastener head and the structure is an integer multiple of the pitch between the first locking features.

* * * * *